April 13, 1926. 1,580,484
C. A. HADLAND
GUARD FOR POULTRY FEED VESSELS
Filed June 4, 1924
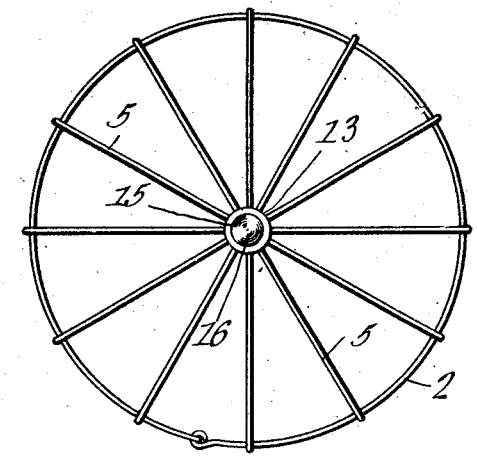
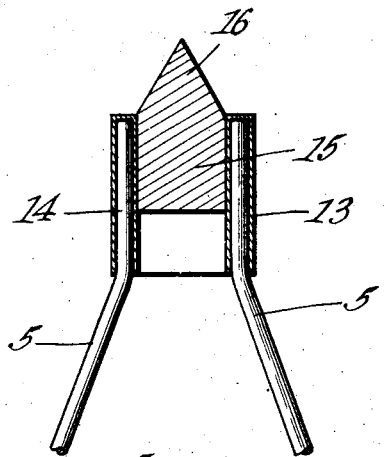
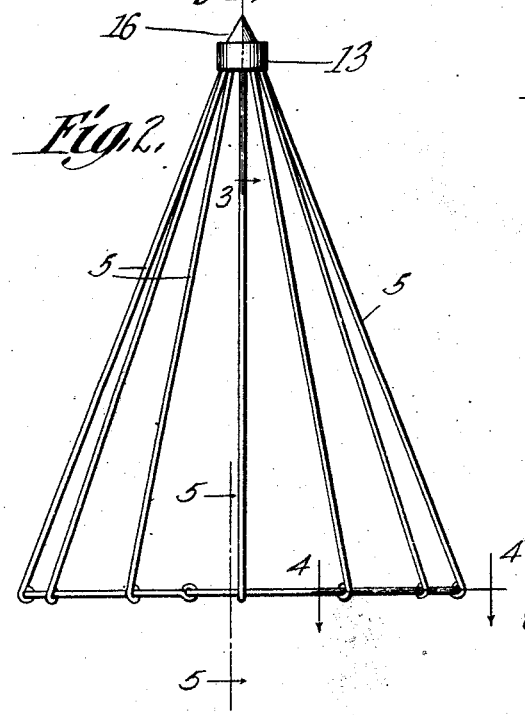
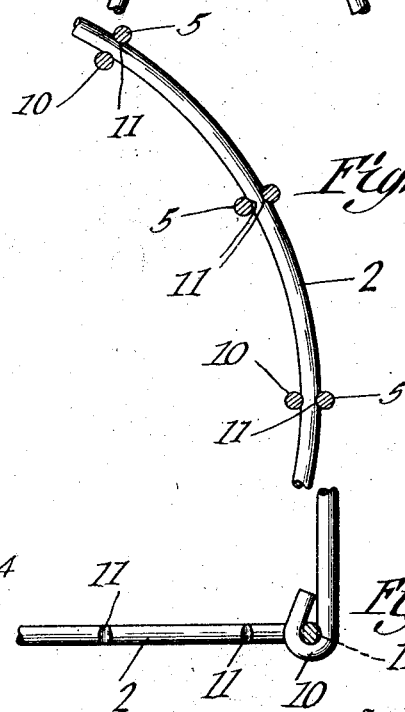
Inventor
C. A. Hadland
By C. A. Snow & Co.
Attorneys Patented Apr. 13, 1926.

1,580,484

UNITED STATES PATENT OFFICE.

CARL A. HADLAND, OF PLAINVIEW, MINNESOTA.

GUARD FOR POULTRY-FEED VESSELS.

Application filed June 4, 1924. Serial No. 717,788.

*To all whom it may concern:*

Be it known that I, CARL A. HADLAND, a citizen of the United States, residing at Plainview, in the county of Wabasha and State of Minnesota, have invented a new and useful Guard for Poulthy-Feed Vessels, of which the following is a specification.

This invention relates to poultry accessories and more particularly to guards for feed and watering vessels.

The object of the invention is to provide a simple and efficient guard especially adapted for use on open pans or pails which while permitting free access of the heads of the fowls to the water or feed will prevent them from soiling the contents of the vessel with their dirty feet or by standing on the edge of the vessel.

Another object of the invention is to equip a guard of this character with means to prevent roosting of the fowls on the guard.

Still another object is to provide a cone-shaped guard of this character constructed so as to be strong and durable as well as cheap to manufacture and which will economize greatly in labor and yet insure the fowl clean drink and food.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 is a plan view of the invention.

Figure 2 is a side elevational view thereof.

Figure 3 is a sectional view taken on line 3—3 of Figure 2.

Figure 4 is a detail horizontal sectional view taken on line 4—4 of Figure 2.

Figure 5 is a detail vertical sectional view taken on line 5—5 of Figure 2, showing the means for uniting the lower ends of the wires to the connecting ring.

In the invention a thimble 13 connects the upper ends of wires 5 and is preferably made double walled as shown in Fig. 8 to form a socket 14 to receive the ends of wires 5. A plug 15 of wood or other suitable material is inserted in the upper end of the thimble and has a cone-shaped or pointed upwardly projecting end 16 designed to prevent fowls from lighting on the guard.

The guards herein shown and described are preferably constructed of heavy wire and may be of any desired size according to the vessels in connection with which they are to be used and the wires 5 are spaced apart at distances according to the size of the poultry to feed through them.

From the above description it will be obvious that a guard constructed as herein shown and described will permit the use of large open vessels with a minimum amount of labor and yet prevent the contents of said vessels from being soiled and also prevent the vessels from being upset since the poultry cannot light on the guards which completely house the vessel. Moreover these guards may be very cheaply constructed so that they may be sold at a minimum cost enabling a number of them to be purchased by poultry men of limited means.

I claim:—

A guard of the class described comprising a supporting ring section, supporting wires secured to the ring and arranged in spaced relation with each other, a thimble embodying an outer wall and an inner wall defining spaces, the upper ends of the supporting wires adapted to be held in the spaces of the thimble, and a plug held within the thimble.

In testimony that I claim the foregoing as my own, I have hereto affixed my signature.

CARL A. HADLAND.